(12) United States Patent
Nakatsuka et al.

(10) Patent No.: US 11,243,542 B2
(45) Date of Patent: Feb. 8, 2022

(54) VEHICLE CONTROL SYSTEM, VEHICLE CONTROL METHOD, VEHICLE CONTROL DEVICE, AND VEHICLE CONTROL PROGRAM

(71) Applicant: HONDA MOTOR CO., LTD., Tokyo (JP)

(72) Inventors: Makoto Nakatsuka, Wako (JP); Shinya Shirokura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 163 days.

(21) Appl. No.: 16/496,508

(22) PCT Filed: Dec. 20, 2017

(86) PCT No.: PCT/JP2017/045721
§ 371 (c)(1),
(2) Date: Sep. 23, 2019

(87) PCT Pub. No.: WO2018/179625
PCT Pub. Date: Oct. 4, 2018

(65) Prior Publication Data
US 2020/0379472 A1   Dec. 3, 2020

(30) Foreign Application Priority Data

Mar. 30, 2017   (JP) .............................. JP2017-067317

(51) Int. Cl.
*G05D 1/02* (2020.01)

(52) U.S. Cl.
CPC ......... *G05D 1/0221* (2013.01); *G05D 1/0223* (2013.01); *G05D 1/0289* (2013.01)

(58) Field of Classification Search
CPC .. G05D 1/0221; G05D 1/0223; G05D 1/0289; B60W 2050/0292;
(Continued)

(56) References Cited

U.S. PATENT DOCUMENTS

2017/0132708 A1* 5/2017 Gordon ................. G06Q 40/08
2018/0001850 A1   1/2018 Kontani

FOREIGN PATENT DOCUMENTS

JP          09-66832        3/1997
JP          2004-114854     4/2004
(Continued)

OTHER PUBLICATIONS

International Search Report and Written Opinion for International Application Serial No. PCT/JP2017/045721 dated Feb. 27, 2018, 7 pages.

*Primary Examiner* — Rodney A Butler

(74) *Attorney, Agent, or Firm* — Amin, Turocy & Watson, LLP

(57) ABSTRACT

In a vehicle control system, a running controller (120) that executes running control of a vehicle without depending on a driving operation of a vehicle occupant and a running device (44) that is a control target of the running controller and outputs a predetermined signal to the running controller are included, and the running controller stops the running control of the vehicle in a case in which the predetermined signal has been blocked from the running device.

7 Claims, 12 Drawing Sheets

(58) Field of Classification Search
CPC ........... B60W 2510/20; B60W 50/029; B60W 60/00186; G08G 1/166; G08G 1/165; B60R 16/02

See application file for complete search history.

(56) References Cited

FOREIGN PATENT DOCUMENTS

| | | |
|---|---|---|
| JP | 2007-076460 | 3/2007 |
| JP | 2016-071635 | 5/2016 |
| WO | 2016-111340 | 7/2016 |

\* cited by examiner

VEHICLE CONTROL SYSTEM, VEHICLE CONTROL METHOD, VEHICLE CONTROL DEVICE, AND VEHICLE CONTROL PROGRAM

TECHNICAL FIELD

The present invention relates to a vehicle control system, a vehicle control method, a vehicle control device, and a vehicle control program.

Priority is claimed on Japanese Patent Application No. 2017-67317, filed Mar. 30, 2017, the content of which is incorporated herein by reference.

BACKGROUND ART

Conventionally, vehicle systems having a redundancy function by adding a preliminary device to a part of a device mounted in a vehicle are known. In relation to this, a vehicle power supply device that mounts a plurality of batteries in a vehicle and can supply power to each electric load from any one of the batteries is known (for example, see Patent Literature 1).

CITATION LIST

Patent Literature

[Patent Literature 1]
PCT Publication No. 2016/111340

SUMMARY OF INVENTION

Technical Problem

In a conventional technology, in a case in which a signal from a device mounted in a vehicle is blocked, there are cases in which a cause of the blocking such as an off operation of a vehicle occupant, disconnection of a communication line connected to the device, or the like cannot be determined, and appropriate running control cannot be performed for the vehicle. The present invention is in consideration of such situations, and one object thereof is to provide a vehicle control system, a vehicle control method, a vehicle control device, and a vehicle control program capable of executing more appropriate running control for a vehicle.

Solution to Problem (1): A vehicle control system including: a running controller that executes running control of a vehicle without depending on a driving operation of a vehicle occupant; and a running device that is a control target of the running controller and outputs a predetermined signal to the running controller, wherein the running controller stops the running control of the vehicle in a case in which the predetermined signal has been blocked from the running device.

(2): In (1), the running controller stops the running control of the vehicle in a case in which the predetermined signal has been blocked from a plurality of running devices connected through a plurality of different communication lines.

(3): In (1) or (2), a power supplier that supplies power to the running controller and the running device and an ignition switch that performs switching between on/off signals indicating whether or not power from the power supplier is supplied to the running controller and the running device are further included, and, in a case in which an on signal from the ignition switch is interrupted and in a case in which the predetermined signal is received from the running device, the running controller performs running control of decelerating or saving the vehicle.

(4): In (3), the running controller decelerates or saves the vehicle during execution of the running control of the vehicle in a case in which there is supply of power from the power supplier to the running controller and in a case in which the predetermined signal is not received from the running device.

(5): In (3) or (4), the running controller blocks supply of power from the power supplier to the running controller in a case in which a signal from the running device to the running controller is blocked in a state in which the vehicle has stopped and in a case in which the running controller detects that an on signal from the ignition switch is maintained.

(6): A vehicle control method using an in-vehicle computer, the vehicle control method including: executing running control of a vehicle without depending on a driving operation of a vehicle occupant; and stopping the running control of the vehicle in a case in which a predetermined signal has been blocked from a running device that is a control target of the running control and outputs the predetermined signal.

(7): A vehicle control device including: a storage device that stores information; and a hardware processor that executes a program stored in the storage device, wherein the hardware processor, by executing the program, is configured to: execute running control of a vehicle without depending on a driving operation of a vehicle occupant; and stop the running control of the vehicle in a case in which a predetermined signal is blocked from a running device that is a control target of the running control and outputs the predetermined signal.

(8): A vehicle control program causing an in-vehicle computer to execute: performing running control of a vehicle without depending on a driving operation of a vehicle occupant; and stopping the running control of the vehicle in a case in which a predetermined signal has been blocked from a running device that is a control target of the running control and outputs the predetermined signal.

Advantageous Effects of Invention

According to (1) or (6) to (8), more appropriate running control can be executed for the vehicle.

According to (2), by using signals from the plurality of running devices connected to a plurality of different communication lines, it can be more appropriately determined whether or not the running control of the vehicle needs to be stopped.

According to (3), deterioration of the state of the ignition switch can be determined regardless of an operation of the ignition switch that is performed by a vehicle occupant, and appropriate running control based on the deterioration of the state can be performed.

According to (4), deterioration of the state of the running device can be determined, and appropriate running control based on the deterioration of the state can be performed.

According to (5), even in a case in which a signal from the ignition switch is fixed to an on signal, the supply of power to the running controller can be appropriately blocked.

DESCRIPTION OF EMBODIMENTS

Hereinafter, a vehicle control system, a vehicle control method, a vehicle control device, and a vehicle control program according to embodiments of the present invention will be described with reference to the drawings. In the embodiments, a vehicle control system is applied to an automated driving vehicle. Automated driving, for example, is driving a vehicle by automatedly controlling at least one of acceleration/deceleration and steering of a vehicle without being dependent on a vehicle occupant's driving operation.

Entire Configuration

Figure 1:
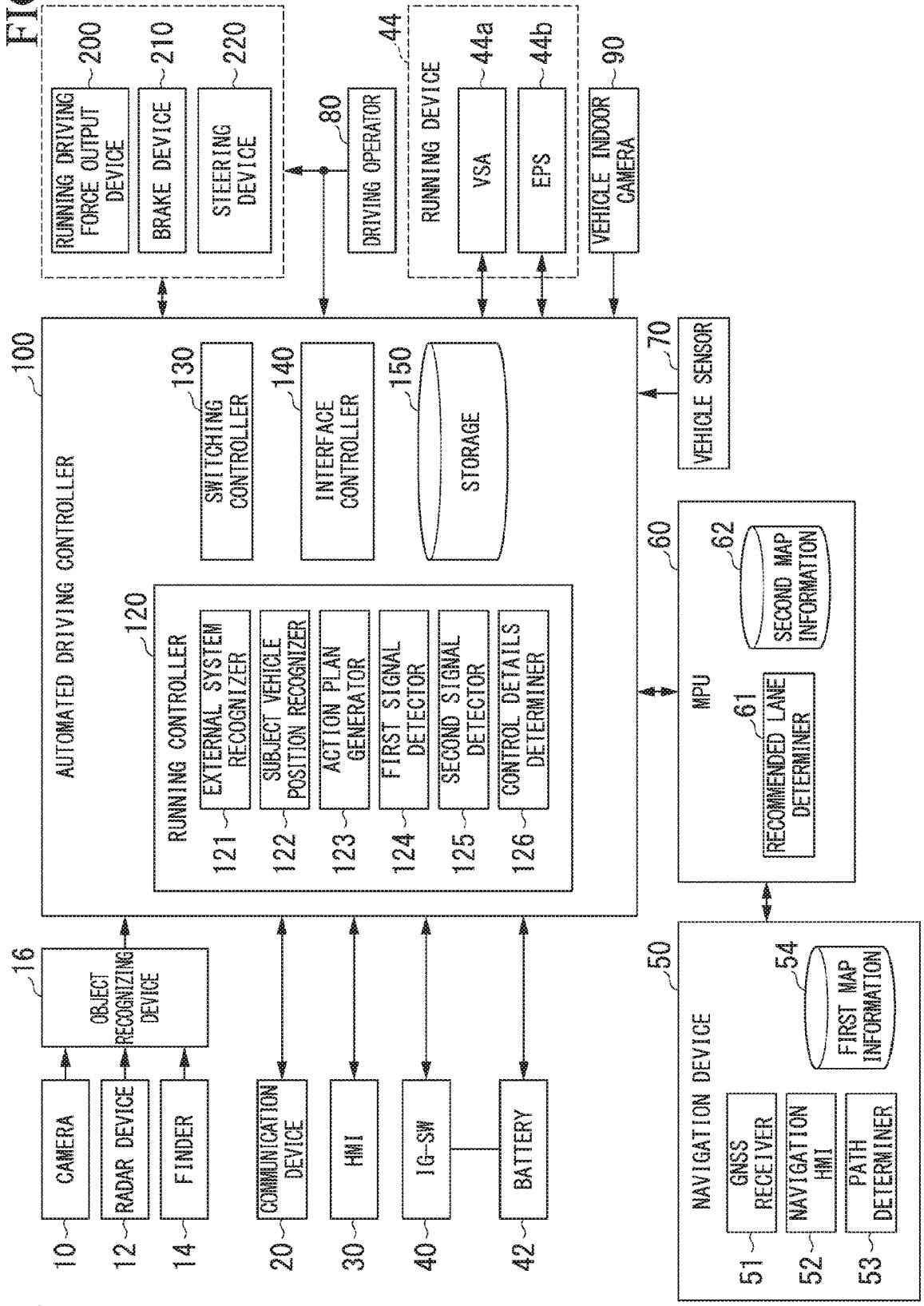
FIG. 1 is a diagram illustrating a configuration example of a vehicle system 1 according to an embodiment.

FIG. 1 is a diagram illustrating a configuration example of a vehicle system 1 according to an embodiment. A vehicle in which the vehicle system 1 is mounted (hereinafter, referred to as a vehicle M) is, for example, a vehicle having two wheels, three wheels, four wheels, or the like, and a driving source thereof is an internal combustion engine such as a diesel engine or a gasoline engine, an electric motor, or a combination thereof. An electric motor operates using power generated using a power generator connected to an internal combustion engine or discharge power of a secondary cell or a fuel cell.

The vehicle system 1, for example, includes a camera 10, a radar device 12, a finder 14, an object recognizing device 16, a communication device 20, a human machine interface (HMI) 30, an ignition switch (IG-SW) 40, a battery 42, a running device 44, a navigation device 50, a micro-processing unit (MPU) 60, a vehicle sensor 70, a driving operator 80, a vehicle indoor camera 90, an automated driving controller 100, a running driving force output device 200, a brake device 210, and a steering device 220.

Such devices are interconnected using a multiplex communication line such as a controller area network (CAN) communication line, a serial communication line, a radio communication network, or the like. The configuration illustrated in FIG. 1 is merely one example, and thus, some components may be omitted, and, furthermore, another component may be added thereto.

In an embodiment, a "vehicle control system," for example, includes the ignition switch 40, the battery 42, the running device 44, and the automated driving controller 100. The automated driving controller 100 is one example of a "vehicle control device." The battery 42 is one example of a "power supplier."

The camera 10, for example, is a digital camera using a solid-state imaging device such as a charge coupled device (CCD) or a complementary metal oxide semiconductor (CMOS). One or a plurality of cameras 10 are installed at arbitrary places in the vehicle M in which the vehicle control system 1 is mounted. In a case in which a front side is to be imaged, the camera 10 is installed at an upper part of a front windshield, a rear face of a rear-view mirror, or the like. In a case in which a rear side is to be imaged, the camera 10 is installed to an upper part of a rear wind shield, a back door, or the like. In a case in which a lateral side is to be images, the camera 10 is installed to a door mirror or the like. The camera 10, for example, periodically images the vicinity of the vehicle M repeatedly. The camera 10 may be a stereo camera.

The radar device 12 emits radiowaves such as millimeter waves to the vicinity of the vehicle M and detects at least a position (a distance and an azimuth) of an object by detecting radiowaves (reflected waves) reflected by the object. One or a plurality of radar devices 12 are installed at arbitrary places in the vehicle M. The radar device 12 may detect a position and a speed of an object using a frequency modulated continuous wave (FMCW) system.

The finder 14 is a light detection and ranging or a laser imaging detection and ranging (LIDAR) finder that detects a distance to a target by measuring light scattered from emitted light. One or a plurality of finders 14 are installed at arbitrary places in the vehicle M.

The object recognizing device 16 may perform a sensor fusion process on results of detection using some or all of the camera 10, the radar device 12, and the finder 14, thereby recognizing a position, a type, a speed, and the like of an object. The object recognizing device 16 outputs a result of recognition to the automated driving controller 100.

The communication device 20, for example, communicates with other vehicles present in the vicinity of the vehicle M using a cellular network, a Wi-Fi network, Bluetooth (registered trademark), dedicated short range communication (DSRC), or the like or communicates with various server apparatuses through a radio base station.

The HMI 30 presents various types of information to a vehicle occupant of the vehicle M and receives an input operation performed by a vehicle occupant. The HMI 30 includes various display devices, a speaker, a buzzer, a touch panel, a switch, a key, and the like. The HMI 30 may include an automated driving changeover switch that performs switching between automated driving and manual driving.

The ignition switch 40 performs switching between on/off signals indicating whether or not power from the battery 42 is supplied to each device included in the vehicle system 1. In a case in which the ignition switch 40 outputs an on signal, power from the battery 42 is supplied to each device of the vehicle system 1, which enables the vehicle M to run. In a case in which the ignition switch 40 outputs an off signal, power from the battery 42 is not supplied to each device. The ignition switch 40, for example, is operated by a vehicle occupant.

The battery 42 supplies power to each device included in the vehicle system 1 on the basis of an on/off signal according to the ignition switch 40. The battery 42 may include a battery management unit (BMU) that manages a charging state and the like on the inside thereof.

The running device 44 is a control target of the running controller 120 and outputs a predetermined signal to the running controller 120. As the running device 44, for example, there are a vehicle stability assist (VSA) 44a and an electric power steering (EPS) 44b. When the vehicle M comes into an unstable status, the VSA 44a inhibits disorder of the behavior of the vehicle M by integrally controlling an output of the running driving force output device 200 and a braking force of the brake device 210. The VSA 44a includes an electronic controller (ECU) for VSA. The ECU for VSA controls the output of the running driving force output device 200 and the braking force of the brake device 210 in accordance with a running state of the vehicle M. The ECU for VSA transmits signals such as an alive counter, a heartbeat signal, a checksum, or the like to the running controller 120.

The EPS 44b assists an operation of a rack and pinion mechanism changing the direction of a steering wheel disposed in the steering device 220 using an actuator such as an electric motor or the like. The EPS 44b includes an ECU for EPS. The ECU for EPS drives an electric motor in accordance with information input from the driving operator 80 and assists the operation of the rack and pinion mechanism. The ECU for EPS transmits signals such as an alive counter, a heartbeat signal, a checksum, or the like to the running controller 120.

The navigation device 50, for example, includes a global navigation satellite system (GNSS) receiver 51, a navigation HMI 52, and a path determiner 53 and stores first map information 54 in a storage device such as a hard disk drive (HDD) or a flash memory. The GNSS receiver 51 identifies a position of a vehicle M on the basis of signals received from GNSS satellites. The position of the vehicle M may be identified or complemented by an inertial navigation system (INS) using an output of the vehicle sensor 70. The navigation HMI 52 includes a display device, a speaker, a touch panel, a key, and the like. A part or the whole of the navigation HMI 52 and the HMI 30 described above may be configured to be shared. The path determiner 53, for example, determines a path (for example, including information relating to a transit point when running up to a destination) from a location of the vehicle M identified by the GNSS receiver 51 (or an input arbitrary location) to a destination input by a vehicle occupant using the navigation HMI 52 by referring to the first map information 54. The first map information 54, for example, is information in which a road form is represented by respective links representing a road and respective nodes connected using the links. The first map information 54 may include a curvature of each road, point of interest (POI) information, and the like. The path determined by the path determiner 53 is output to the MPU 60. The navigation device 50 may perform path guide using the navigation HMI 52 on the basis of the path determined by the path determiner 53. The navigation device 50, for example, may be realized by a function of a terminal device such as a smartphone, a tablet terminal, or the like held by a user. The navigation device 50 may transmit a current position and a destination to a navigation server through the communication device 20 and acquire a path transmitted from the navigation server in response thereto.

The MPU 60, for example, functions as a recommended lane determiner 61 and maintains second map information 62 in a storage device such as a HDD or a flash memory. The recommended lane determiner 61 divides a path provided from the navigation device 50 into a plurality of blocks (for example, divides the path into blocks of 100 [m] in the advancement direction of the vehicle) and determines a recommended lane for each block by referring to the second map information 62. The recommended lane determiner 61 determines a lane from the left side in which the vehicle will run. In a case in which there is a branching point, a merging point, or the like in the path, the recommended lane determiner 61 determines a recommended lane such that the vehicle M can run along a reasonable running path for advancement to a branching destination.

The second map information 62 is map information having an accuracy higher than that of the first map information 54. The second map information 62, for example, includes information of the center of respective lanes, information on boundaries between lanes, or the like. In the second map information 62, road information, traffic regulations information, address information (address and zip code), facilities information, telephone information, and the like may be included. In the road information, information representing a type of road such as an expressway, a toll road, a national road, or a prefectural road and information such as the number of lanes of a road, an emergency parking area, a width of each lane, a gradient of a road, a position of a road (three-dimensional coordinates including longitude, latitude, and a height), a curvature of the curve of a lane, locations of merging and branching points of lanes, a sign installed on a road, and the like are included. The second map information 62 may be updated as is necessary by accessing another device using the communication device 20.

The vehicle sensor 70 includes a vehicle speed sensor detecting a speed of the vehicle M, an acceleration sensor detecting an acceleration, a yaw rate sensor detecting an angular velocity around a vertical axis, an azimuth sensor detecting a direction of the vehicle M, and the like.

The driving operator 80, for example, includes an acceleration pedal, a brake pedal, a shift lever, a steering wheel, and other operators. A sensor detecting the amount of an operation or the presence/absence of an operation is installed in the driving operator 80, and a result of detection thereof is output to the automated driving controller 100 or the running driving force output device 200 or one or both of the brake device 210 and the steering device 220.

The vehicle indoor camera 90, for example, images an upper half body of a vehicle occupant sitting on a seat of the vehicle with the face disposed at the center. The vehicle indoor camera 90, for example, periodically images a vehicle occupant repeatedly. A captured image acquired by the vehicle indoor camera 90 is output to the automated driving controller 100.

Automated Driving Controller

The automated driving controller 100, for example, includes a running controller 120, a switching controller 130, an interface controller 140, and a storage 150. Each of the running controller 120, the switching controller 130, and the interface controller 140 is realized by a hardware processor such as a central processing unit (CPU) executing a program (software). Some or all of the functional units of the running controller 120, the switching controller 130, and the interface controller 140 may be realized by hardware such as a large scale integration (LSI), an application specific integrated circuit (ASIC), a field-programmable gate array (FPGA), or the like or may be realized by software and hardware in cooperation.

The running controller 120, for example, includes an external system recognizer 121, a subject vehicle position recognizer 122, an action plan generator 123, a first signal detector 124, a second signal detector 125, and a control details determiner 126. The running controller 120, for example, executes running control of the vehicle through automated driving. The running controller 120, for example, controls the running driving force output device 200, the brake device 210, and the steering device 220 such that the vehicle M passes through a target locus generated by the action plan generator 123 at a scheduled time as automated driving control in a state in which there is no operation instruction from the driving operator 80.

The external system recognizer 121 recognizes states of surrounding vehicles such as positions, speeds, and accelerations on the basis of information input from the camera 10, the radar device 12, and the finder 14 through the object recognizing device 16. The position of a surrounding vehicle may be represented as a representative point of the surrounding vehicle such as the center or gravity, a corner, or the like and may be represented by an area represented by the contour of the surrounding vehicle. The "state" of a surrounding vehicle may include an acceleration or a jerk or is "action state" (for example, the vehicle is changing lanes or is to change lanes) of the surrounding vehicle.

The external system recognizer 121 may recognize positions of a guard rail, a telegraph pole, a parked vehicle, persons such as pedestrians, and other objects in addition to the surrounding vehicles.

The subject vehicle position recognizer 122, for example, recognizes a lane (running lane) in which the vehicle M is running and a relative position and a posture of the vehicle M with respect to the running lane. The subject vehicle position recognizer 122, for example, by comparing a pattern (for example, an array of a solid line and a broken line) of a road partition line that is acquired from the second map information 62 with a pattern of the road partition line in the vicinity of the vehicle M that is recognized from an image captured by the camera 10, recognizes a running lane. In this recognition, the position of the vehicle M acquired from the navigation device 50 and a processing result acquired using the INS may be also taken into account.

Figure 2:
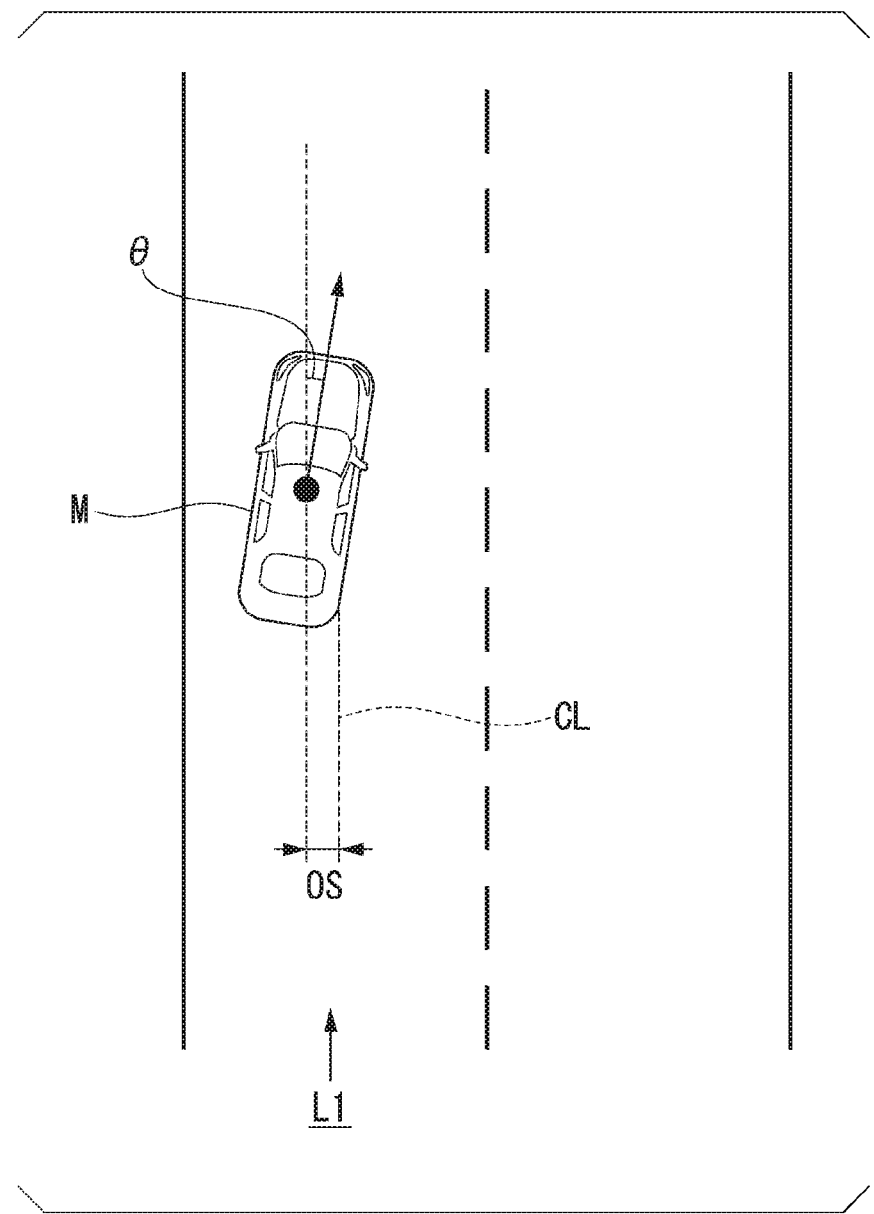
FIG. 2 is a diagram illustrating a view in which a relative position and a posture of a vehicle M with respect to a running lane L1 are recognized by a subject vehicle position recognizer 122.

Then, the subject vehicle position recognizer 122, for example, recognizes a position and a posture of the vehicle M with respect to the running lane. FIG. 2 is a diagram illustrating a view in which a relative position and a posture of a vehicle M with respect to a running lane L1 are recognized by the subject vehicle position recognizer 122. The subject vehicle position recognizer 122, for example, recognizes an offset OS of a reference point (for example, center of gravity) of the vehicle M from the running lane center CL and an angle θ of an advancement direction of the vehicle M formed with respect to a line acquired by aligning the running lane center CL as a relative position and a posture of the vehicle M with respect to the running lane L1. In addition, instead of this, the subject vehicle position recognizer 122 may recognize a position of the reference point of the vehicle M with respect to one side end of the running lane L1 or the like as a relative position of the vehicle M with respect to the running lane. The relative position of the vehicle M recognized by the subject vehicle position recognizer 122 is provided for the recommended lane determiner 61 and the action plan generator 123.

The action plan generator 123 generates an action plan for the vehicle M to perform automated driving toward a destination and the like. For example, the action plan generator 123 determines events to be sequentially executed in automated driving control such that the vehicle runs in a lane determined as a recommended lane by the recommended lane determiner 61 and responds to a surrounding status of the vehicle M. As the events in automated driving according to an embodiment, for example, there are a constant-speed running event in which the vehicle runs at a constant speed in the same running lane, a lane changing event in which the running lane of the vehicle M is changed, an overtaking event in which the vehicle overtakes a preceding vehicle, a following running event in which the vehicle runs to follow a preceding vehicle, a merging event in which the vehicle merges at a merging point, a branching event in which the vehicle M is caused to run in a target direction at a branching point of a road, an urgent stop event in which the vehicle M is urgently stopped, a switching event for ending automated driving and switching to manual driving, and the like. In addition, during the execution of such an event, there are also cases in which an action for avoidance is planned on the basis of surrounding statuses of the vehicle M (the presence/absence of surrounding vehicles and pedestrians, lane contraction according to road construction, and the like).

The action plan generator 123 generates a target locus along which the vehicle M will run in the future. The target locus, for example, includes a speed element. For example, the target locus is generated by setting a plurality of reference times in the future for every predetermined sampling time (for example, about a fraction of [sec]) as a set of target points (locus points) to be reached at such reference times. For this reason, in a case in which an interval of locus points is long, it represents that the vehicle runs at a high speed in a section between the locus points.

Figure 3:
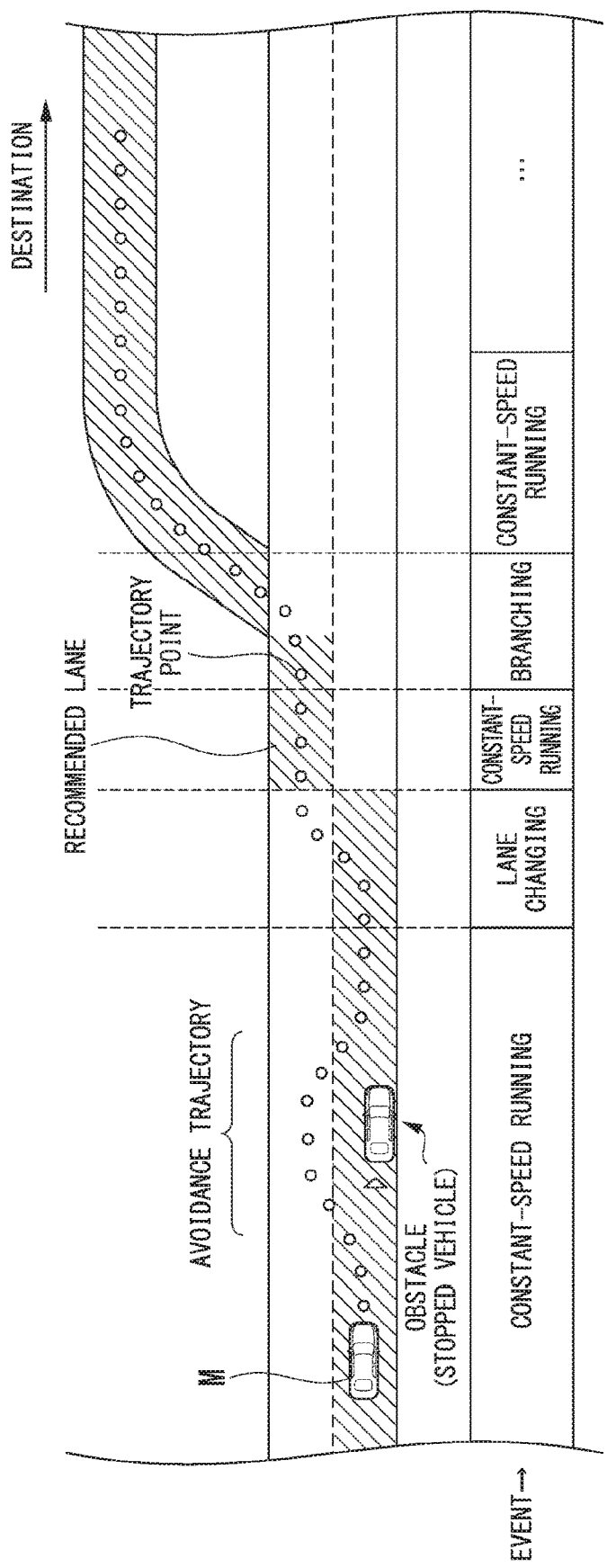
FIG. 3 is a diagram illustrating a view in which a target locus is generated on the basis of a recommended lane.

FIG. 3 is a diagram illustrating a view in which a target locus is generated on the basis of a recommended lane. As illustrated in the drawing, the recommended lane is set such that it is convenient for the vehicle to run along a path to a destination. When the vehicle reaches a position before a predetermined distance from a recommended lane switching point (may be determined in accordance with a type of event), the action plan generator 123 starts the lane changing event, the branching event, the merging event, or the like. In a case in which there is a need for avoiding an obstacle during the execution of each event, as illustrated in the drawing, an avoidance locus is generated.

The action plan generator 123, for example, generates a plurality of candidates for a target locus and selects an optimal target locus that is appropriate for a path to the destination at that time point on the basis of points of view of safety and efficiency.

The first signal detector 124, for example, detects that a check sum output by the VSA 44a and the EPS 44b of the running device 44 is not a predetermined signal. The predetermined signal, for example, is a signal including data or an array defined as being normal in advance. The first signal detector 124 may detect that the alive counter output by the VSA 44a and the EPS 44b has not been updated even when a predetermined time elapses or may detect that there is no reception of a heart beat signal from a communication line connected to the VSA 44a and the EPS 44b.

The second signal detector 125, for example, detects a device or a communication line in which communication is disconnected, or a signal is blocked among devices of the vehicle system 1 connected using communication lines. For example, during running control in automated driving, in a case in which no signal has been received from a connected communication line for a predetermined time or more, the second signal detector 125 detects that communication with a target device or a communication line has been interrupted, or a signal is blocked from a communication line.

For example, the control details determiner 126 determines control details of automated driving and the like on the basis of detection results and the like acquired by the first signal detector 124 or the second signal detector 125. Details of the function of the control details determiner 126 will be described later.

The switching controller 130 performs switching of the driving mode of the vehicle M on the basis of the action plan generated by the action plan generator 123. For example, the switching controller 130 switches the driving mode from manual driving to automated driving at a planned start point of automated driving. The switching controller 130 switches the driving mode from the automated driving to the manual driving at a planned end point of the automated driving.

The switching controller 130, for example, may perform switching between the automated driving and the manual driving on the basis of a switching signal input from the automated driving changeover switch included in the HMI 30. The switching controller 130, for example, may switch the driving mode of the vehicle M from the automated driving to the manual driving on the basis of an operation directing acceleration, deceleration, or steering on the driving operator 80 such as the acceleration pedal, the brake pedal, the steering wheel, or the like.

At the time of the manual driving, input information from the driving operator 80 is directly output to the running driving force output device 200, the brake device 210, and the steering device 220. The input information from the driving operator 80 may be output to the running driving force output device 200, the brake device 210, and the steering device 220 through the automated driving controller 100. The electronic controller (ECU) of each of the running driving force output device 200, the brake device 210, and the steering device 220 performs each operation on the basis of input information from the driving operator 80 or the like.

The interface controller 140 causes the HMI 30 to output a state of a device used for executing running control, a running state of the vehicle M at the time of the automated driving or the manual driving, a timing at which switching between the automated driving and the manual driving is performed, a notification relating to information causing a vehicle occupant to perform the manual driving and the like, and the like. The interface controller 140 may output information received by the HMI 30 to the running controller 120 and the switching controller 130.

Various kinds of information used for executing running control according to an embodiment or results of the execution, and the like are stored in the storage 150. The storage 150 is realized by a read only memory (ROM), a random access memory (RAM), a hard disk drive (HDD), a flash memory, or the like. A program executed by the hardware processor may be stored in the storage 150 in advance or may be downloaded from an external device through an in-vehicle Internet facility or the like. A program may be installed in the storage 150 by loading a portable storage medium storing the program into a drive device not illustrated in the drawing.

The running driving force output device 200 outputs a running driving force (torque) for allowing a vehicle M to run to driving wheels. The running driving force output device 200, for example, includes an engine that is a combination of an internal combustion engine, an electric motor, a transmission gear, and the like, a throttle motor that controls the amount of driving of the engine, and an engine ECU controlling the throttle motor. The engine ECU drives the throttle motor in accordance with information input from the running controller 120 or information input from the driving operator 80 and outputs a running driving force according to the engine to driving wheels.

The brake device 210, for example, includes a brake caliper, a cylinder delivering hydraulic pressure to the brake caliper, an electric motor generating hydraulic pressure in the cylinder, and a brake ECU that controls the electric motor. The brake ECU controls the electric motor on the basis of the information input from the running controller 120 or the information input from the driving operator 80 such that a brake torque corresponding to a braking operation is output to each vehicle wheel. The brake device 210 may include a mechanism that delivers a hydraulic pressure generated in accordance with an operation for a brake pedal included in the driving operator 80 to the cylinder through a master cylinder as a backup. The brake device 210 is not limited to the configuration described above and may be an electronic control-type hydraulic brake device that delivers a hydraulic pressure of the master cylinder to the cylinder by controlling a hydraulic actuator on the basis of information input from the running controller 120 or the information input from the driving operator 80. The brake device 210 may include a plurality of systems of brake devices in consideration of the point of view of safety.

The steering device 220, for example, includes a rack and pinion mechanism that changes the direction of the steering wheel, an electric motor that applies a force to the rack and pinion mechanism, and a steering ECU that controls the electric motor. The steering ECU changes the direction of the steering wheel by driving the electric motor in accordance with information input from the running controller 120 or information input from the driving operator 80.

Running Control Based on Signal Detection

Figure 4:
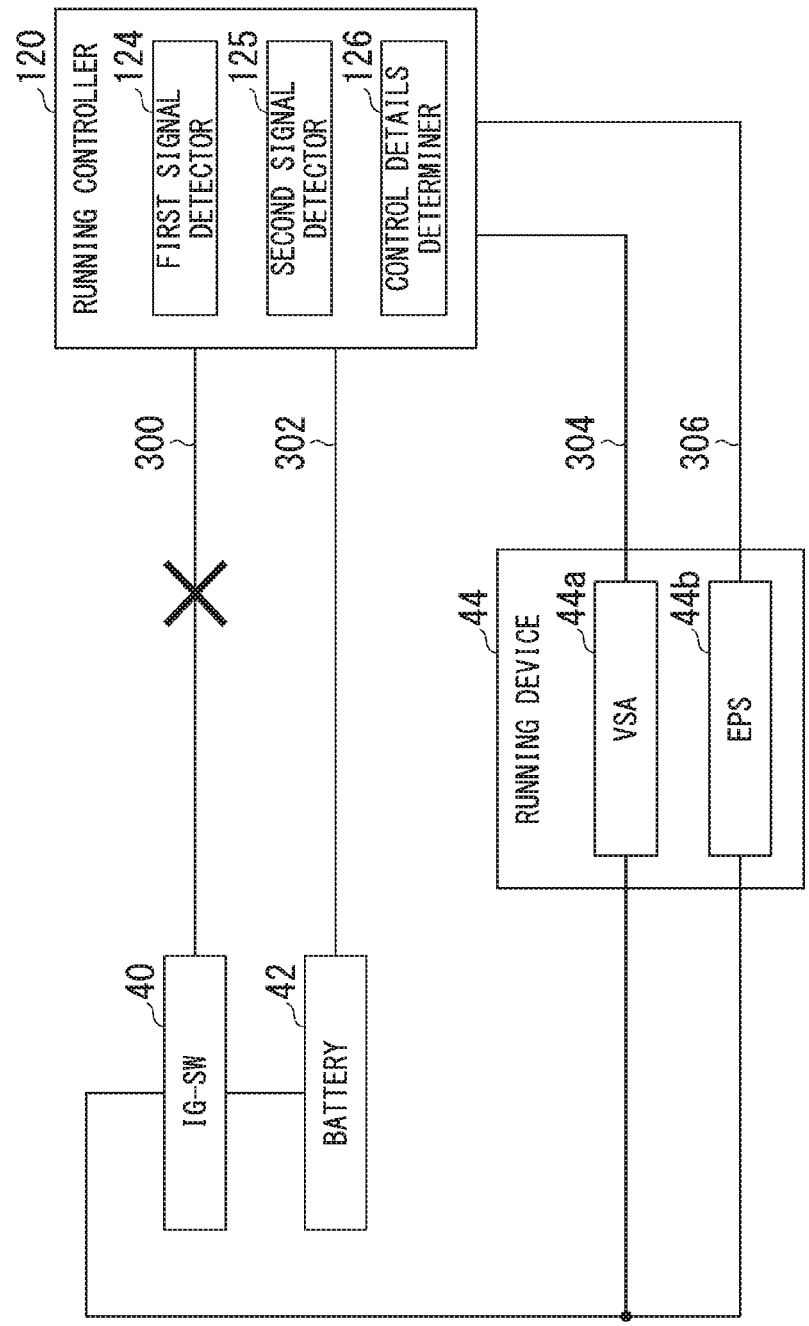
FIG. 4 is a diagram illustrating an example of determination of control details in a case in which a communication line of an ignition switch 40 is cut off.

Next, running control based on detection results acquired by the first signal detector 124 and the second signal detector 125 will be described more specifically. FIG. 4 is a diagram illustrating an example of determination of control details in a case in which a communication line of an ignition switch 40 is cut off. FIG. 4 illustrates an example in which the ignition switch 40, the battery 42, the running device 44, and the running controller 120 are connected using communication lines. FIG. 4 illustrates the first signal detector 124, the second signal detector 125, and the control details determiner 126 among the components of the running controller 120.

The running controller 120 is connected to the ignition switch 40, the battery 42, the VSA 44$a$, and the EPS 44$b$ through different communication lines 300 to 306. In a case in which a signal received from the communication line 300 connected to the ignition switch 40 is an on signal, power from the battery 42 is supplied to the running controller 120. In a case in which the on signal received from the communication line 300 is interrupted, the supply of power to the running controller 120 is blocked. Here, for example, in a case in which the communication line 300 is disconnected, the running controller 120 cannot receive an on signal from the ignition switch 40. However, in such a case, it cannot determined whether it is caused by an off operation for the ignition switch 40 that is performed by a vehicle occupant or disconnection of the communication line 300. Thus, the control details determiner 126 detects signals from the VSA 44a and EPS 44b and determines control details for the vehicle M on the basis of the detected signals. Hereinafter, an example of control determined by the control details determiner 126 will be described more specifically.

First Control

In a case in which the vehicle M is in the middle of automated driving, first control stops running control using the automated driving in a case in which it is detected that signals from the VSA 44a and the EPS 44b have been blocked.

For example, the second signal detector 125 detects that signals output from the VSA 44a and the EPS 44b have been blocked. Next, in a case in which it is detected by the second signal detector 125 that signals output from the VSA 44a and the EPS 44b have been blocked, the control details determiner 126 stops the running control using the automated driving. Accordingly, it can be determined the vehicle M has entered an ignition off state in accordance with blocking of signals from the communication lines 304 and 306 of the VSA 44a and the EPS 44b. Therefore, the running controller 120 can appropriately determine whether or not the running control using the automated driving needs to be stopped.

Second Control

In a case in which a signal acquired from the VSA 44a or the EPS 44b is not a predetermined signal, second control performs deceleration control of the vehicle M or saving control of saving the vehicle M to a safe position (for example, an emergency parking area, a roadside strip, a road shoulder, or a parking area).

Figure 5:
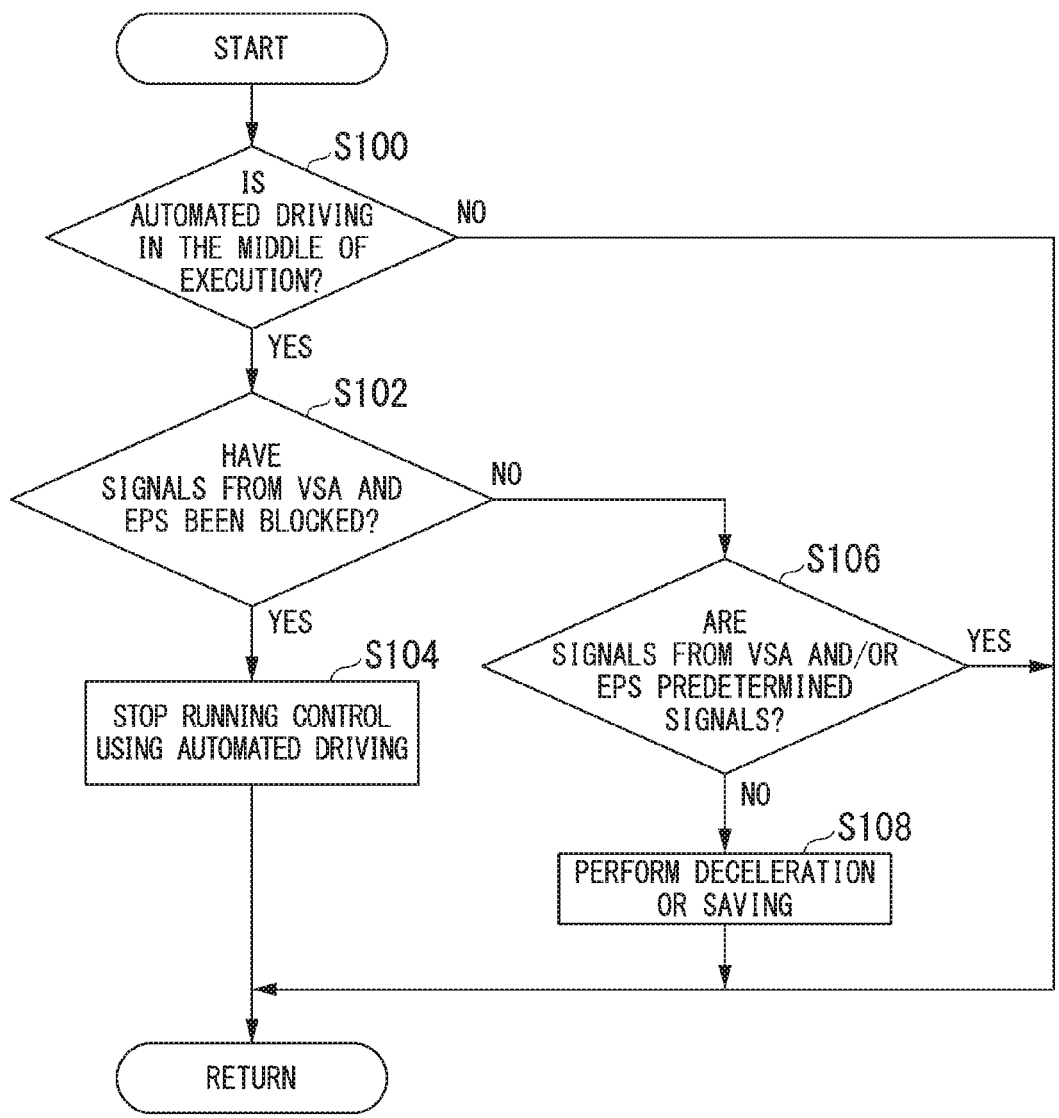
FIG. 5 is a flowchart illustrating one example of the flow of a running control process corresponding to second control.

FIG. 5 is a flowchart illustrating one example of the flow of a running control process corresponding to second control. First, the running controller 120 determines whether or not automated driving of the vehicle M is in the middle of execution (Step S100). In a case in which it is determined that the automated driving is in the middle of execution, the second signal detector 125 determines whether or not signals from the VSA 44a and the EPS 44b have been blocked (Step S102). In a case in which it is determined that signals from the VSA 44a and the EPS 44b have been blocked, the running controller 120 stops the running control of the automated driving of the vehicle M (Step S104).

In a case in which it is determined that signals from the VSA 44a and the EPS 44b have not been blocked, the first signal detector 124 determines whether or not signals from the VSA 44a and/or the EPS 44b are predetermined signals (Step S106). In a case in which it is determined that signals from the VSA 44a and/or the EPS 44b are not predetermined signals, the running controller 120 performs control of decelerating the vehicle M or saving the vehicle M to a safe position (Step S108). In the control of deceleration or saving, control of stopping the vehicle M may be included. In this way, the process of this flowchart ends. Also in a case in which it is determined that signals from the VSA 44a and/or the EPS 44b are the predetermined signals in the process of Step S106 or in a case in which the automated driving is not in the middle of execution in the process of Step S100, the process of this flowchart ends. In this way, more appropriate running control can be performed on the basis of the state of the running device 44.

Third Control

Third control determines whether or not the state of the ignition switch 40 has deteriorated on the basis of signals from the VSA 44a and the EPS 44b and an on/off signal of the ignition switch 40 and determines details of the running control in a case in which it is determined that the state of the ignition switch 40 has deteriorated.

Figure 6:
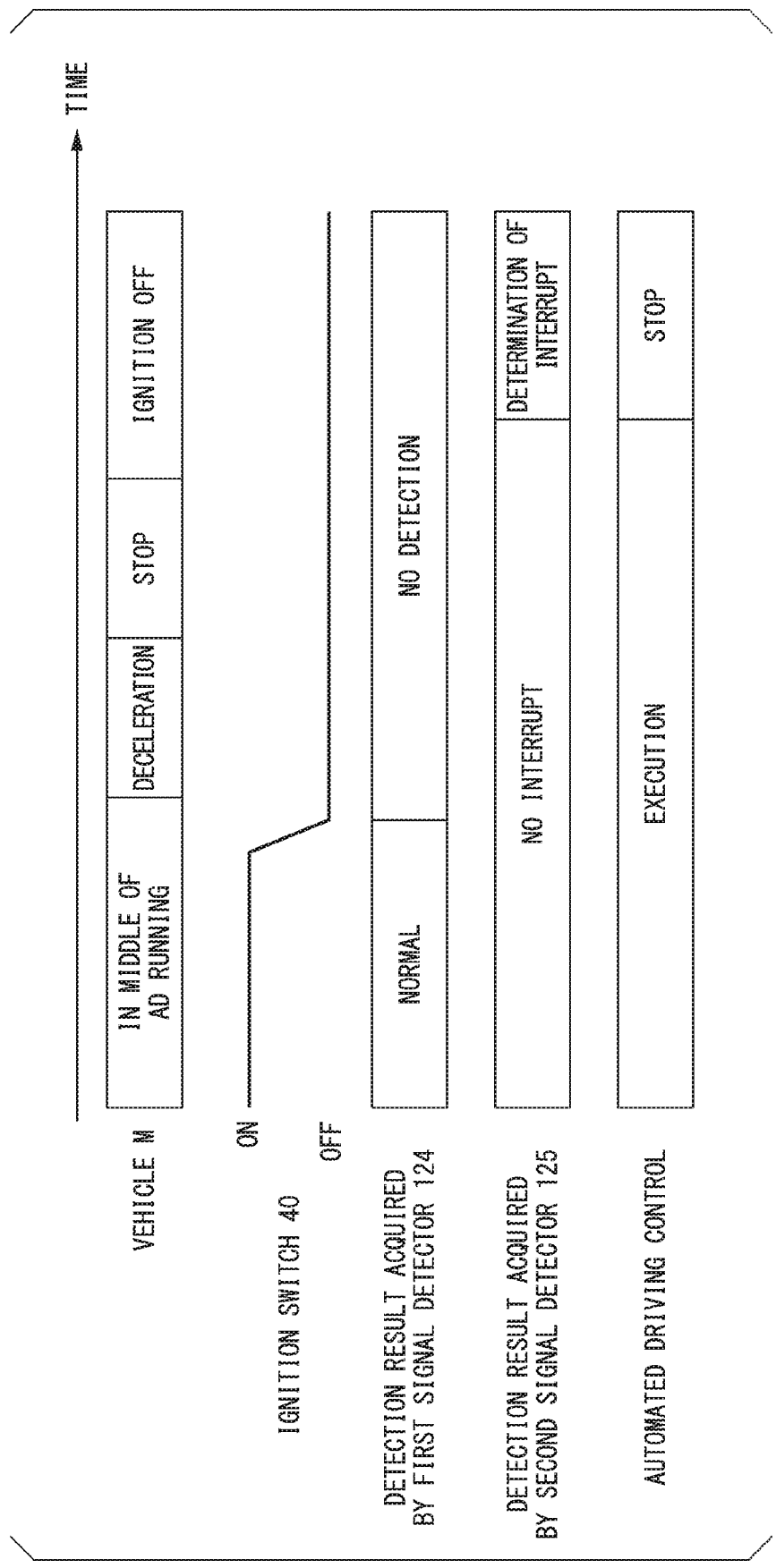
FIG. 6 is a diagram illustrating third control.

FIG. 6 is a diagram illustrating the third control. FIG. 6 illustrates control details of the vehicle M using the running controller 120 on the basis of an on/off signal of the ignition switch 40 and detection results acquired by the first signal detector 124 and the second signal detector 125 in accordance with elapse of time. For example, in a case in which an on signal is received from the ignition switch 40, a detection result acquired by the first signal detector 124 is normal (a predetermined signal has been received), and interrupt of a signal has not been detected in a detection result acquired by the second signal detector 125, the running controller 120 executes running of automated driving.

For example, in a case in which an off signal has been received from the communication line 300 connected to the ignition switch 40 and in a case in which a signal has not been interrupted in a detection result acquired by the second signal detector 125, the control details determiner 126 determines that the state of the ignition switch 40 has deteriorated. Then, the control details determiner 126 determines execution of deceleration and stop control using the automated driving of the vehicle M. The running controller 120 performs deceleration control of the vehicle M determined by the control details determiner 126. In a case in which the vehicle M has stopped in accordance with the deceleration control of the automated driving, the running controller 120 determines that the state has become an ignition off state and stops the running control of the automated driving.

Figure 7:
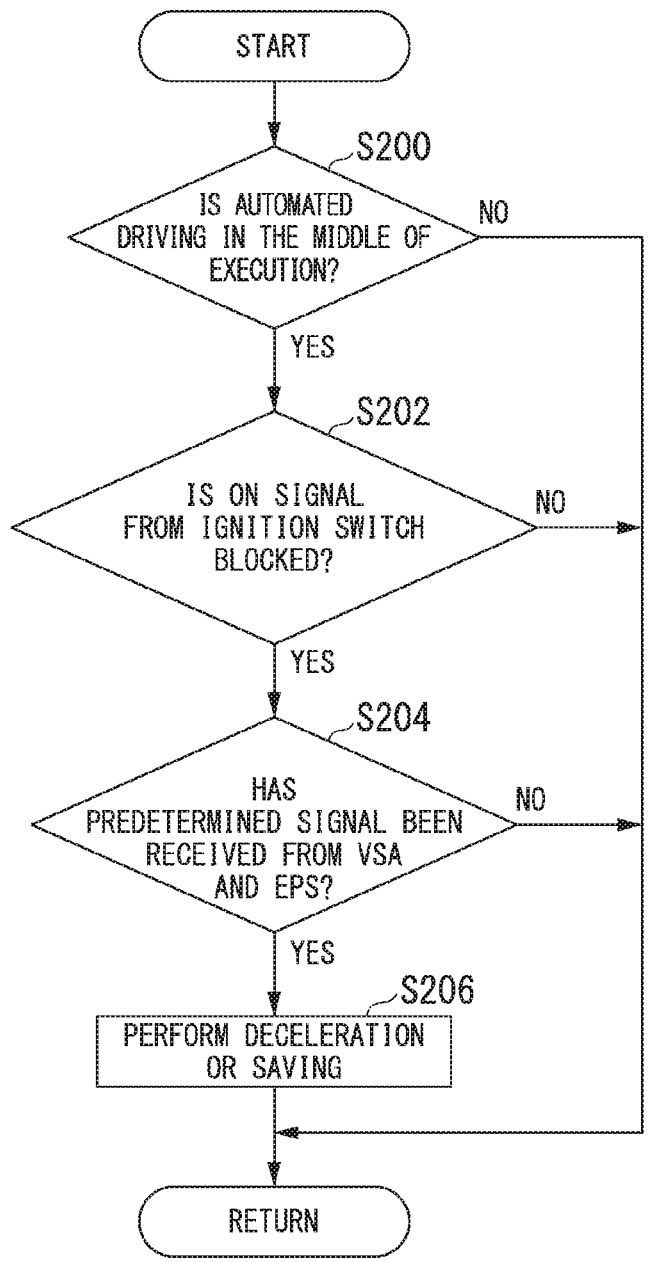
FIG. 7 is a flowchart illustrating one example of the flow of a running control process corresponding to the third control.

FIG. 7 is a flowchart illustrating one example of the flow of a running control process corresponding to the third control. First, the running controller 120 determines whether or not automated driving of the vehicle M is in the middle of execution (Step S200). In a case in which it is determined that the automated driving is in the middle of execution, the running controller 120 determines whether or not an on signal from the ignition switch 40 has been interrupted (Step S202). In a case in which it is determined that the on signal from the ignition switch 40 has been interrupted, the second signal detector 125 determines whether or not predetermined signals have been received from the VSA 44a and the EPS 44b (Step S204). In a case in which it is determined that the predetermined signals have been received from the VSA 44a and the EPS 44b, the running controller 120 performs control of decelerating the vehicle M or saving the vehicle M to a safe position (Step S206). In this way, the process of this flowchart ends. In a case in which it is determined that the automated driving is not in the middle of execution in the process of Step S200, even in a case in which it is determined that the on-signal from the ignition switch 40 has not been interrupted in the process of Step S202 or in a case in which it is determined that the predetermined signals have not been received from the VSA 44a and the EPS 44b in the process of Step S204, the process of this flowchart ends.

In this way, the deterioration of the state of the ignition switch 40 can be determined regardless of an operation for the ignition switch 40 that is performed by a vehicle occupant, and appropriate vehicle control based on the deterioration of the state can be performed.

Fourth Control

Fourth control performs deceleration control of the vehicle M or saving control of the subject vehicle M in a case in which a signal acquired from at least one of the VSA 44*a* and the EPS 44*b* is not a predetermined signal in a state in which an on signal from the ignition switch 40 is received.

Figure 8:
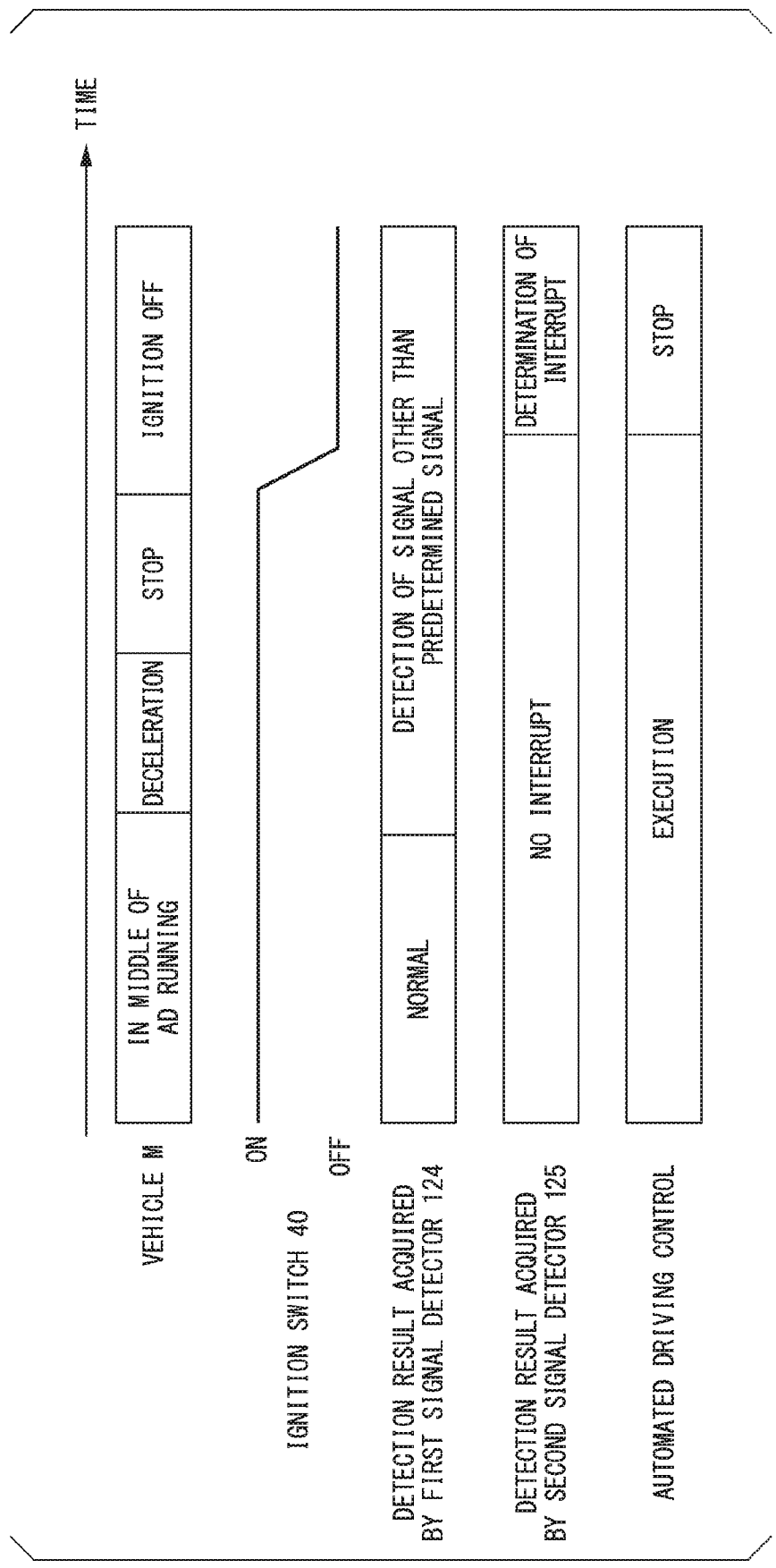
FIG. 8 is a diagram illustrating fourth control.

FIG. 8 is a diagram illustrating the fourth control. FIG. 8, similar to FIG. 6, illustrates control details of the vehicle M using the running controller 120 on the basis of an on/off signal of the ignition switch 40 and detection results acquired by the first signal detector 124 and the second signal detector 125 in accordance with elapse of time.

In a case in which an on signal has been received from the communication line 300 connected to the ignition switch 40 and in a case in which a signal that is not a predetermined signal has been detected from at least one of the VSA 44*a* and the EPS 44*b* by the first signal detector 124, the control details determiner 126 determines that the state of the at least one from which the predetermined signal has not been transmitted has deteriorates. Then, the control details determiner 126 determines execution of deceleration control as automated driving of the vehicle M. The running controller 120 performs deceleration control of the vehicle M determined by the control details determiner 126. In a case in which the vehicle M has stopped in accordance with the deceleration control of the automated driving, the running controller 120 determines that the state has become an ignition off state and stops the running control of the automated driving.

Figure 9:
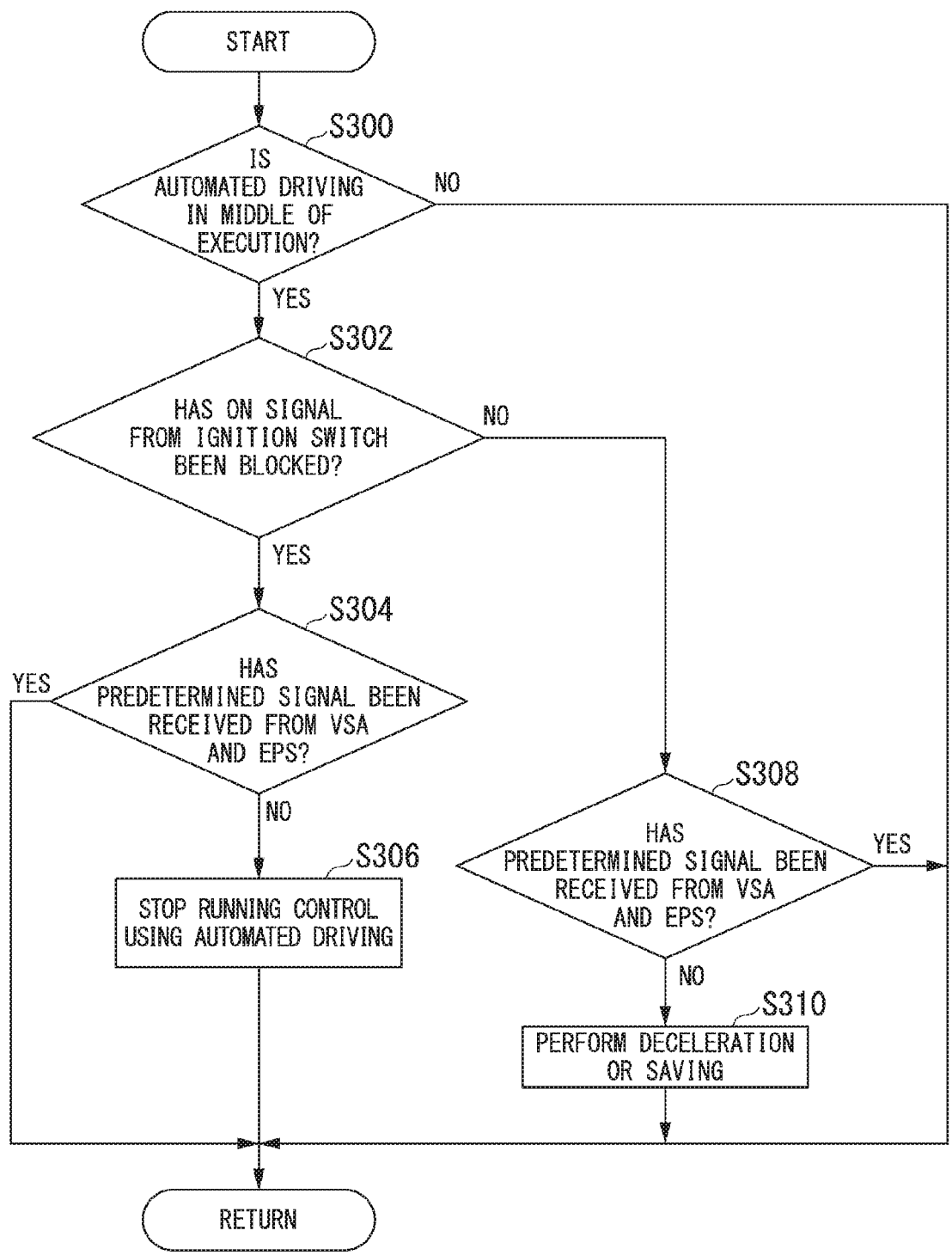
FIG. 9 is a flowchart illustrating one example of the flow of a running control process corresponding to the fourth control.

FIG. 9 is a flowchart illustrating one example of the flow of a running control process corresponding to the fourth control. First, the running controller 120 determines whether or not the automated driving of the vehicle M is in the middle of execution (Step S300). In a case in which it is determined that the automated driving is in the middle of execution, the running controller 120 determines whether or not an on signal from the ignition switch 40 has been interrupted (Step S302). In a case in which it is determined that the on signal from the ignition switch 40 has been interrupted, the second signal detector 125 determines whether or not predetermined signals have been received from the VSA 44*a* and the EPS 44*b* (Step S304). In a case in which it is determined that the predetermined signals have not been received from the VSA 44*a* and the EPS 44*b*, the running controller 120 stops the running control using the automated driving (Step S306).

In a case in which it is determined that the on signal from the ignition switch 40 has not been interrupted in the process of Step S302, the second signal detector 125 determines whether or not predetermined signals have been received from the VSA 44*a* and the EPS 44*b* (Step S308). In a case in which it is determined that the predetermined signals have not been received from the VSA 44*a* and the EPS 44*b*, the running controller 120 performs control of decelerating the vehicle M or saving the vehicle M to a safe position (Step S310). In this way, the process of this flowchart ends. In a case in which it is determined that the predetermined signals have been received from the VSA 44*a* and the EPS 44*b* in the process of Step S304 or S308 or also in a case in which it is determined that the automated driving is not in the middle of execution in the process of Step S300, the process of this flowchart ends. In this way, deterioration of the state of the VSA 44*a* or the EPS 44*b* can be determined, and appropriate running control based on the deterioration of the state can be performed.

Fifth Control

Fifth control blocks supply of power to the running controller 120 after the vehicle M has stopped using the automated driving control in a case in which the ignition off state is formed, and signals from the VSA 44*a* and the EPS 44*b* have been blocked and in a case in which the on signal from the ignition switch 40 is maintained.

Figure 10:
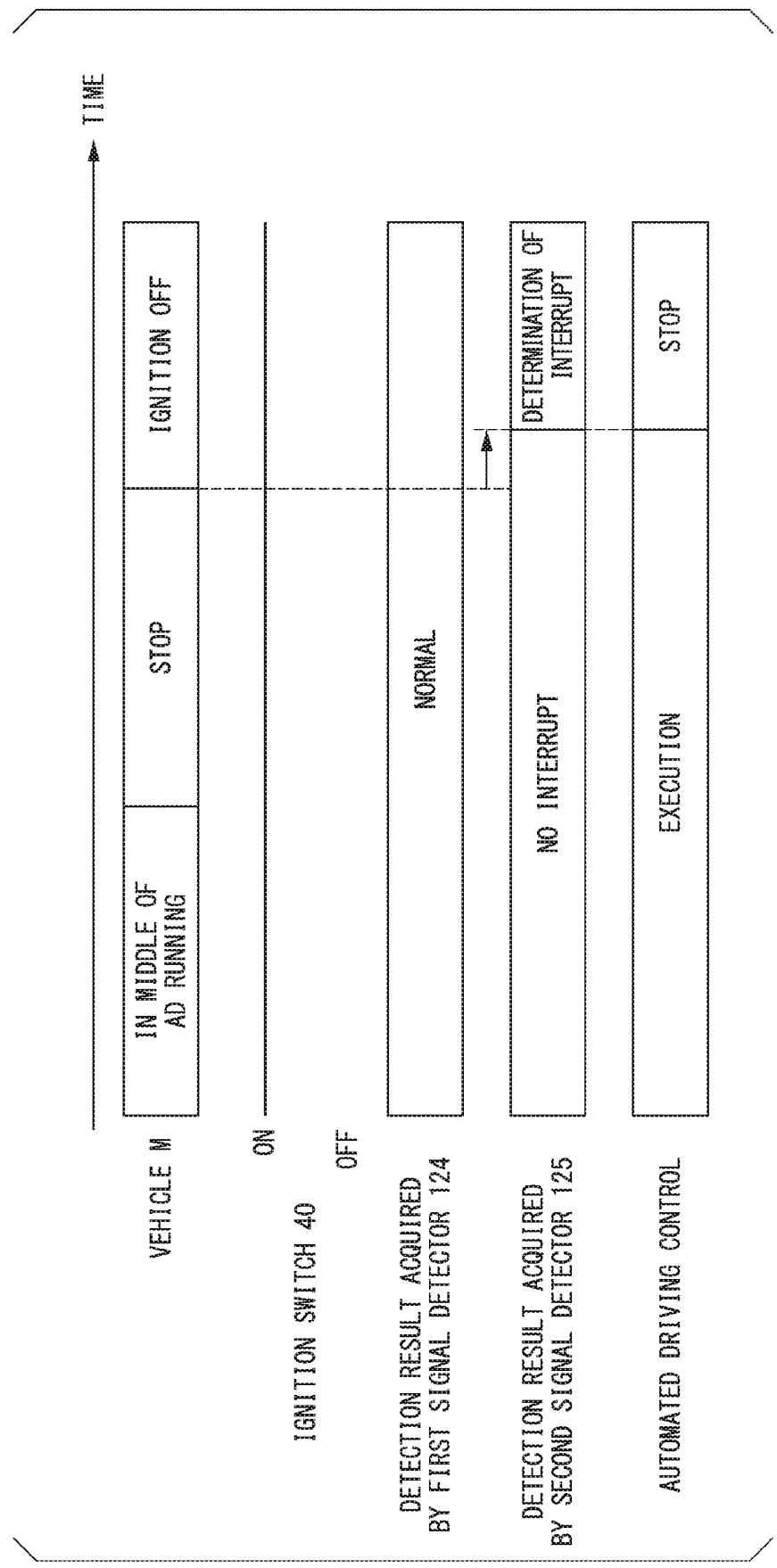
FIG. 10 is a diagram illustrating fifth control.

FIG. 10 is a diagram illustrating the fifth control. FIG. 10, similar to FIGS. 6 and 8, illustrates control details of the vehicle M using the running controller 120 on the basis of an on/off signal of the ignition switch 40 and detection results acquired by the first signal detector 124 and the second signal detector 125 in accordance with elapse of time.

The running controller 120, for example, performs control of causing the vehicle M to run to a destination using automated driving and stopping the vehicle M after the vehicle arrives at the destination. The running controller 120 executes running control of setting an ignition off state in a case in which the vehicle M has stopped. At this time, after a predetermined time has elapsed after the off state, interrupt of communication is detected by the second signal detector 125. However, the signal from the ignition switch 40 is maintained to be the on signal. In this case, the control details determiner 126 determines that the state of the ignition switch 40 has deteriorated and blocks the supply of power from the battery 42 to the running controller 120 in correspondence with a timing at which the automated driving control has stopped or interrupt according to the second signal detector 125 has been determined.

Figure 11:
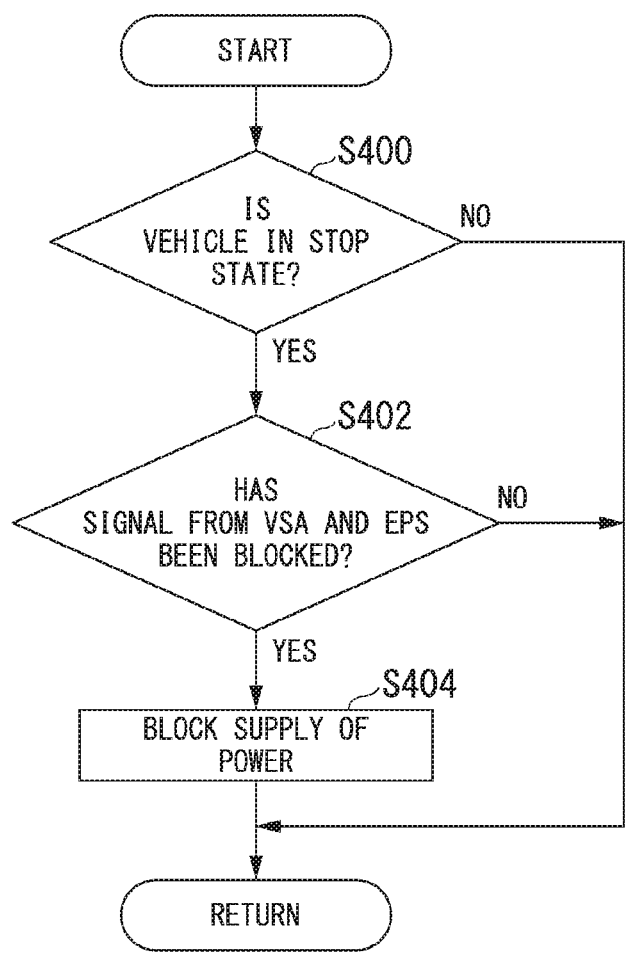
FIG. 11 is a flowchart illustrating one example of the flow of a running control process corresponding to the fifth control.

FIG. 11 is a flowchart illustrating one example of the flow of a running control process corresponding to the fifth control. First, the running controller 120 determines whether or not the vehicle M is in a stop state (Step S400). In a case in which it is determined that the vehicle M is in the stop state, the second signal detector 125 determines whether or not signals from the VSA 44*a* and the EPS 44*b* have been blocked (Step S402). In a case in which it is determined that signals from the VSA 44*a* and the EPS 44*b* have been blocked, the running controller 120 blocks the supply of power from the battery 42 (Step S404). In this way, the process of this flowchart ends. In a case in which the vehicle is not in the stop state in the process of Step S400 or also in a case in which it is determined that signals from the VSA 44*a* and the EPS 44*b* have not been blocked in the process of Step S402, the process of this flowchart ends. In this way, for example, even in a case in which a signal from the ignition switch 40 is fixed to the on signal, vehicle control of appropriately blocking the supply of power to the running controller 120 can be performed.

Modified Example

In the embodiments described above, the running device 44 may be any one of the VSA 44*a* and the EPS 44*b*, and, instead of or in addition to the VSA 44*a* or the EPS 44*b*, a driving support device such as auto lane changing (ALC), low speed car passing (LSP), or the like or other devices may be included. In a case in which the vehicle system 1 includes three or more running devices, the running controller 120 executes at least one of the first to fifth controls described above on the basis of a signal received from each running device. The first control to the fifth control described above may combine a part or the whole of other control.

According to the embodiments described above, the vehicle system 1 includes: the running controller 120 that executes running control of a vehicle M without depending on a driving operation of a vehicle occupant; and the running device that is a target of the running controller 120 for control and outputs a predetermined signal to the running controller 120, and the running controller 120 stops the running control of the vehicle M in a case in which a predetermined signal is blocked from the running device 44, whereby erroneous determination at the time of stopping the running control for the vehicle M can be inhibited, and more appropriate running control can be executed.

Hardware Configuration

Figure 12:
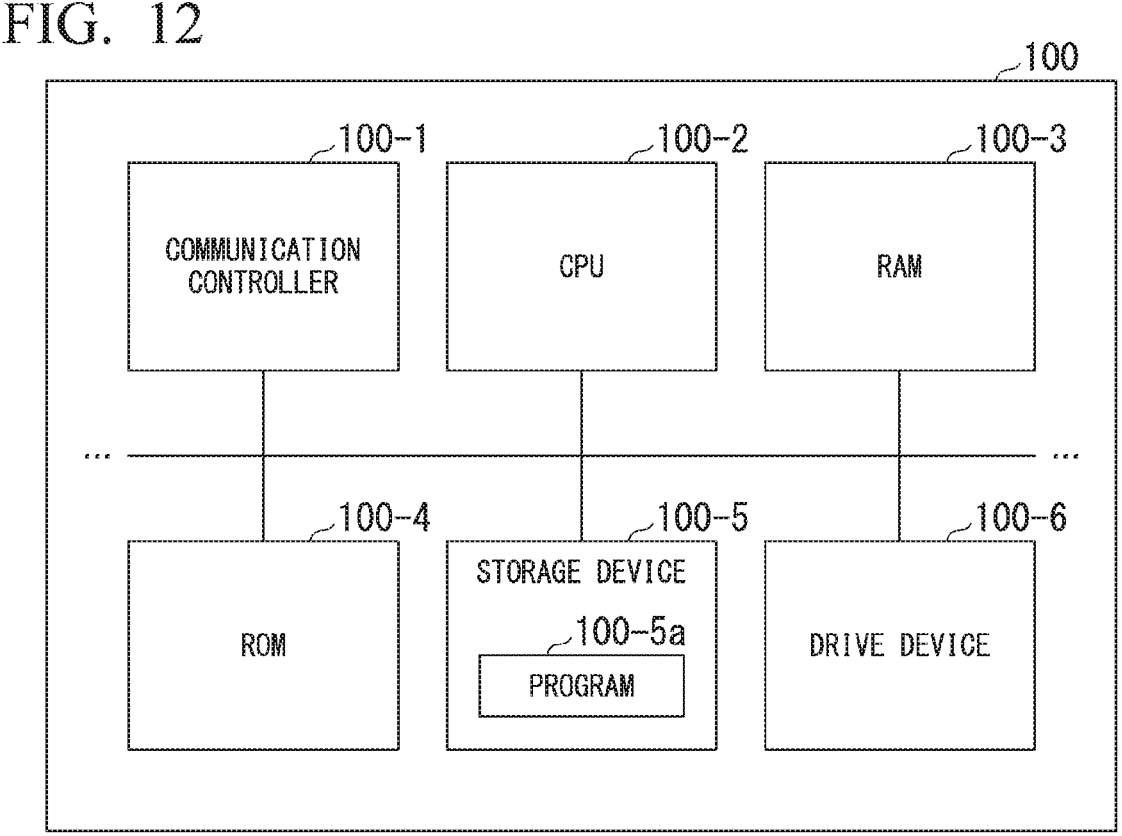
FIG. 12 is a diagram illustrating one example of the hardware configuration of an automated driving controller 100 according to an embodiment.

The automated driving controller 100 according to the embodiments described above, for example, is realized by a hardware configuration as illustrated in FIG. 12. FIG. 12 is a diagram illustrating one example of the hardware configuration of an automated driving controller 100 according to an embodiment.

The automated driving controller 100 has a configuration in which a communication controller 100-1, a CPU 100-2, a RAM 100-3, a ROM 100-4, a storage device 100-5 such as a flash memory or an HDD, and a drive device 100-6 are interconnected through an internal bus or a dedicated communication line. A portable storage medium such as an optical disc is loaded into the drive device 100-6. A program 100-5a stored in the storage device 100-5 is expanded into the RAM 100-3 by a DMA controller (not illustrated in the drawing) or the like and is executed by the CPU 100-2, whereby the functional units of the automated driving controller 100 are realized. A program referred to by the CPU 100-2 may be stored in a portable storage medium loaded in the drive device 100-6 or may be downloaded from another device through a network.

The embodiment described above can be represented as below.

A vehicle control device that includes a storage device and a hardware processor executing a program stored in the storage device, and the hardware processor, by executing the program described above, is configured to execute running control of a vehicle without depending on a driving operation of a vehicle occupant and stop the running control of the vehicle in a case in which a predetermined signal has been blocked from a running device that is a control target of the running control and outputs the predetermined signal.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

REFERENCE SIGNS LIST

1 Vehicle system
10 Camera
12 Radar device
14 Finder
16 Object recognizing device
20 Communication device
30 HMI
40 Ignition switch
42 Battery
44 Running device
50 Navigation device
60 MPU
70 Vehicle sensor
80 Driving operator
90 Vehicle indoor camera
100 Automated driving controller
120 running controller
130 Switching controller
140 Interface controller
150 Storage
200 Running driving force output device
210 Brake device
220 Steering device
M Vehicle

What is claim is:

1. A vehicle control system comprising:
a running controller that executes running control of a vehicle without depending on a driving operation of a vehicle occupant;
a running device that is a control target of the running controller and outputs a predetermined signal to the running controller;
a power supplier that supplies power to the running controller and the running device; and
an ignition switch that performs switching between on/off signals indicating whether or not power from the power supplier is supplied to the running controller and the running device,
wherein the running controller stops the running control of the vehicle in a case in which the predetermined signal has been blocked from the running device,
wherein, in a case in which an on signal from the ignition switch is interrupted and in a case in which the predetermined signal is received from the running device, the running controller performs running control of decelerating or saving the vehicle.

2. The vehicle control system according to claim 1, wherein the running controller stops the running control of the vehicle in a case in which the predetermined signal has been blocked from a plurality of running devices connected through a plurality of different communication lines.

3. The vehicle control system according to claim 1, wherein the running controller decelerates or saves the vehicle during execution of the running control of the vehicle in a case in which there is supply of power from the power supplier to the running controller and in a case in which the predetermined signal is not received from the running device.

4. The vehicle control system according to claim 1, wherein the running controller blocks supply of power from the power supplier to the running controller in a case in which a signal from the running device to the running controller is blocked in a state in which the vehicle has stopped and in a case in which the running controller detects that an on signal from the ignition switch is maintained.

5. A vehicle control method using an in-vehicle computer, the vehicle control method comprising:
executing running control of a vehicle without depending on a driving operation of a vehicle occupant;
supplying power to a running controller and a running device;
performing, by an ignition switch, switching between on/off signals indicating whether or not power from a power supplier is supplied to the running controller and the running device;
stopping the running control of the vehicle in a case in which a predetermined signal has been blocked from a running device that is a control target of the running control and outputs the predetermined signal; and in a case in which an on signal from the ignition switch is interrupted and in a case in which the predetermined signal is received from the running device, performing running control of decelerating or saving the vehicle.

6. A vehicle control device comprising:

a storage device that stores information; and a hardware processor that executes a program stored in the storage device, wherein the hardware processor, by executing the program, is configured to:

execute running control of a vehicle without depending on a driving operation of a vehicle occupant;

supply power to a running controller and a running device;

performing, by an ignition switch, switching between on/off signals indicating whether or not power from a power supplier is supplied to the running controller and the running device;

stop the running control of the vehicle in a case in which a predetermined signal is blocked from a running device that is a control target of the running control and outputs the predetermined signal; and in a case in which an on signal from the ignition switch is interrupted and in a case in which the predetermined signal is received from the running device, performing running control of decelerating or saving the vehicle.

7. A non-transitory computer-readable storage medium that stores a vehicle control program causing an in-vehicle computer to execute:

performing running control of a vehicle without depending on a driving operation of a vehicle occupant;

supplying power to a running controller and a running device;

performing, by an ignition switch, switching between off/off signals indicating whether or not power from a power supplier is supplied to the running controller and the running device;

stopping the running control of the vehicle in a case in which a predetermined signal has been blocked from a running device that is a control target of the running control and outputs the predetermined signal; and in a case in which an on signal from the ignition switch is interrupted and in a case in which the predetermined signal is received from the running device, performing running control of decelerating or saving the vehicle.

* * * * *